US012062380B2

(12) United States Patent
Kleijn et al.

(10) Patent No.: US 12,062,380 B2
(45) **Date of Patent: *Aug. 13, 2024**

(54) SPEECH CODING USING AUTO-REGRESSIVE GENERATIVE NEURAL NETWORKS

(71) Applicant: Google LLC, Mountain View, CA (US)

(72) Inventors: Willem Bastiaan Kleijn, Lower Hutt (NZ); Jan K. Skoglund, San Francisco, CA (US); Alejandro Luebs, San Francisco, CA (US); Sze Chie Lim, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,413

(22) Filed: May 8, 2023

(65) Prior Publication Data

US 2023/0368804 A1 Nov. 16, 2023

Related U.S. Application Data

(63) Continuation of application No. 17/332,898, filed on May 27, 2021, now Pat. No. 11,676,613, which is a (Continued)

(51) Int. Cl.
*G10L 19/02* (2013.01)
*G10L 25/30* (2013.01)

(52) U.S. Cl.
CPC .......... *G10L 19/0204* (2013.01); *G10L 25/30* (2013.01)

(58) Field of Classification Search
CPC ............................ G10L 19/0204; G10L 25/30
See application file for complete search history.

(56) References Cited

U.S. PATENT DOCUMENTS

2003/0115051 A1* 6/2003 Chen ........................ G10L 19/02 704/E19.01
2005/0091041 A1 4/2005 Ramo et al.
2017/0092258 A1 3/2017 Edrenkin

FOREIGN PATENT DOCUMENTS

WO WO 2018048934 8/2018

OTHER PUBLICATIONS

'www.intu.int' [online] "Method for the subjective assessment of intermediate sound quality (MUSHRA)," Rec. ITU-R.BS.1534-1, 2001-2003, [retrieved on Mar. 11, 2019] Retrieved from Internet: URL< https://www.itu.int/dms_pubrec/itu-r/rec/bs/R-REC-BS.1534-1-200301-S!!PDF-E.pdf> 18 pages.

(Continued)

*Primary Examiner* — Sonia L Gay
(74) *Attorney, Agent, or Firm* — Fish & Richardson P.C.

(57) ABSTRACT

Methods, systems, and apparatus, including computer programs encoded on computer storage media, for coding speech using neural networks. One of the methods includes obtaining a bitstream of parametric coder parameters characterizing spoken speech; generating, from the parametric coder parameters, a conditioning sequence; generating a reconstruction of the spoken speech that includes a respective speech sample at each of a plurality of decoder time steps, comprising, at each decoder time step: processing a current reconstruction sequence using an auto-regressive generative neural network, wherein the auto-regressive generative neural network is configured to process the current reconstruction to compute a score distribution over possible speech sample values, and wherein the processing comprises conditioning the auto-regressive generative neural network on at least a portion of the conditioning sequence; and sampling a speech sample from the possible speech sample values.

20 Claims, 4 Drawing Sheets

Related U.S. Application Data continuation of application No. 16/206,823, filed on Nov. 30, 2018, now Pat. No. 11,024,321.

(56) References Cited

OTHER PUBLICATIONS

'www.speex.org,' [online] "Speex," Available on or before Dec. 11, 2007 [retrieved on Mar. 5, 2019 ] Retrieved from Internet: URL< www.speex.org> 3 pages.
'www.tapr.org' [online] "Codec 2—open source speech coding at 2400 bits's and below," D. Rowe, 2011 [retrieved on Mar. 11, 2019] Retrieved from Internet: URL< https://www.tapr.org/pdf/DCC2011-Codec2-VK5DGR.pdf > 5 pages.
Agida et al., "On the Use of WaveNet as a Statistical Vocoder," Presented at 2018 IEEE International Conference on Acoustics, Speech and Signal Processing, Calgary, AB, Canada, Apr. 15-20, 2018, pp. 5674-5678.
Ai et al., Sample RN N-Based Neural Vocoder for Statistical Parametric Speech Synthesis, 2018 IEEE International Conference on Acoustics, Speech and Signal Processing (ICASSP}, Apr. 15-20, 2018, 3 pages.
Atal et al. "Speech analysis and synthesis by linear prediction of the speech wave," J. Acoust. Soc. America, vol. 50(2B) Aug. 1971, 20 pages.
Bell et al. "Reduction of speech spectra by analysis-by-synthesis techniques," J. Acoust. Soc. Of America, vol. 33(12), Dec. 1961, 12 pages.
Bonafonte et al., "Spanish Statistical Parametric Speech Synthesis using a Neural Vocoder," Interspeech, 2018, pp. 1998-2001.
Dunn et al. "Speaker recognition from coded speech and the effect of score normalization," Conference Record of the 35th Asilomar Conference on Signals, Systems and Computers, vol. 2 , Nov. 2001, 6 pages.
Kalchbrenner et al. "Efficient Neural Audio Synthesis," arXiv 1802.08435v2, Jun. 25, 2018, 10 pages.
Kleijn et al. "Interpolation of the pitch-predictor parameters in analysis-by-synthesis speech coders," IEEE Transactions of Speech and Audio Processing, vol. 2(1), Jan. 1994, 13 pages.
Kleijn et al. "Rate distribution between model and signal," Proc. IEEE Workshop on Applic. Signal Process, Oct. 2007, 4 pages.
Kleijn et al., "Wave Net Based Lo Rate Speech Coding", 2018 IEEE International Conference on Acoustics, Speech and Signal Processing (ICASSP}, Apr. 15-20, 2018, whole document (Year: 2018).
Lookabough et al. "High-resolution theory and the vector quantizer advantage," IEEE Trans Information Theory, vol. IT-35(5), 1989, 14 pages.
McAulay et al. "Speech analysis-synthesis based on a sinusoidal representation," IEEE Trans. Acoust. Speech Signal Process., vol. 34, Aug. 1986, 11 pages.
McCree et al. "A 2.4 kbit/s MELP encoder candidate for the new U.S. federal standard," Int. Conf. on Acoust. Apr. 1988, 5 pages.
Mehri et al. "SampleRNN: An Unconditional End-to-End Neural Audio Generation Model," arXiv 1612.07837v2, Feb. 11, 2017, 11 pages.
Pasco et al. "Source coding algorithms for fast data compression," PhD Dissertation, Doctor of Philosophy, Stanford University, May 1976, 115 pages.
Piccardi et al. "Hidden Markov models with kernel density estimation of emission probabilities and their use in activity recognition," Comp. Vision and Pattern Recognition, Jun. 2007, 9 pages.
Singhal et al. "Improving performance of multi-pulse LPC coders at low bit rates," IEEE International Conference on Acoustics, Speech and Signal Processing, vol. 9, Mar. 1984, 4 pages.
Sotelo et al., "Char2Wav: End-to-End Speech Synthesis," ICLR, Feb. 17, 2017, 6 pages.
Tamamori et al. "Speaker-dependent WaveNet vocoder," Proceedings Interspeech, Aug. 2017, 5 pages.
Tokuda et al. "Speech parameter generation algorithms for HMM-based speech synthesis," IEEE International Conference on Acoustics, Speech and Signal Processing, vol. 3, Jun. 2000, 4 pages.
Van den Oord et al. "WaveNet: A generative model for raw audio," arXiv 1609.03499v2, Sep. 19, 2016, 15 pages.
Verhelst et al. "An overlap-add technique based on waveform similarity (WSOLA) for high quality time-scale modification of speech," IEEE Int. Conf. on Acoust., vol. 2, Apr. 1993, 4 pages.
Wan et al. "Generalized end-to-end loss for speaker verification," arXiv 1710.10467v4, Jan. 24, 2019, 5 pages.

* cited by examiner

SPEECH CODING USING AUTO-REGRESSIVE GENERATIVE NEURAL NETWORKS

CROSS-REFERENCE TO RELATED APPLICATION

This is a continuation of U.S. application Ser. No. 17/332,898, filed on May 27, 2021, which is a continuation of U.S. application Ser. No. 16/206,823, filed on Nov. 30, 2018, now U.S. Pat. No. 11,024,321. The disclosures of the prior applications are considered part of and are incorporated by reference in the disclosure of this application.

BACKGROUND

This specification relates to speech coding using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, this specification describes techniques for speech coding using auto-regressive generative neural networks.

Particular embodiments of the subject matter described in this specification can be implemented so as to realize one or more of the following advantages.

A system can effectively reconstruct speech with high-quality from the bit stream of a low-rate parametric coder by employing a decoder auto-regressive generative neural network and, optionally, an encoder auto-regressive generative neural network. Thus, high quality speech decoding can be achieved while limiting the amount of data that needs to be transmitted over a network from the encoder to the decoder. More specifically, parametric coders like the ones used in this specification operate on narrow-band speech with a relatively low sampling rate, e.g., 8 kHz. To generate high quality output speech, however, a wide-band signal, e.g., 16 kHz or greater, is typically required. Thus, conventional systems cannot generate high quality output speech using only parametric coding parameters, even if wide-band extension is applied after the parametric decoder, e.g., because the low-rate parametric coders parameters do not provide enough information for conventional decoders to generate quality speech. However, by making use of a decoder auto-regressive generative neural network to generate speech conditioned on the parametric coding parameters, the described systems allow high quality speech to be generated using only the bitstream of the parametric coder.

In particular, results that match or exceed the state of the art can be achieved while significantly reducing the amount of data that is transmitted over the network from the encoder to the decoder. That is, in some described aspects, only the parametric coding parameters need to be transmitted. In some other described aspects, reconstruction quality can be ensured while reducing the data required to be transmitted by only transmitting entropy coded speech when the decoder auto-regressive generative neural network cannot accurately reconstruct the input speech using only the parametric coding parameters. Because only the parametric coding parameters, i.e., and not the entropy coded values, are transmitted when the speech can be accurately reconstructed, the amount of data required to be transmitted can be greatly reduced.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
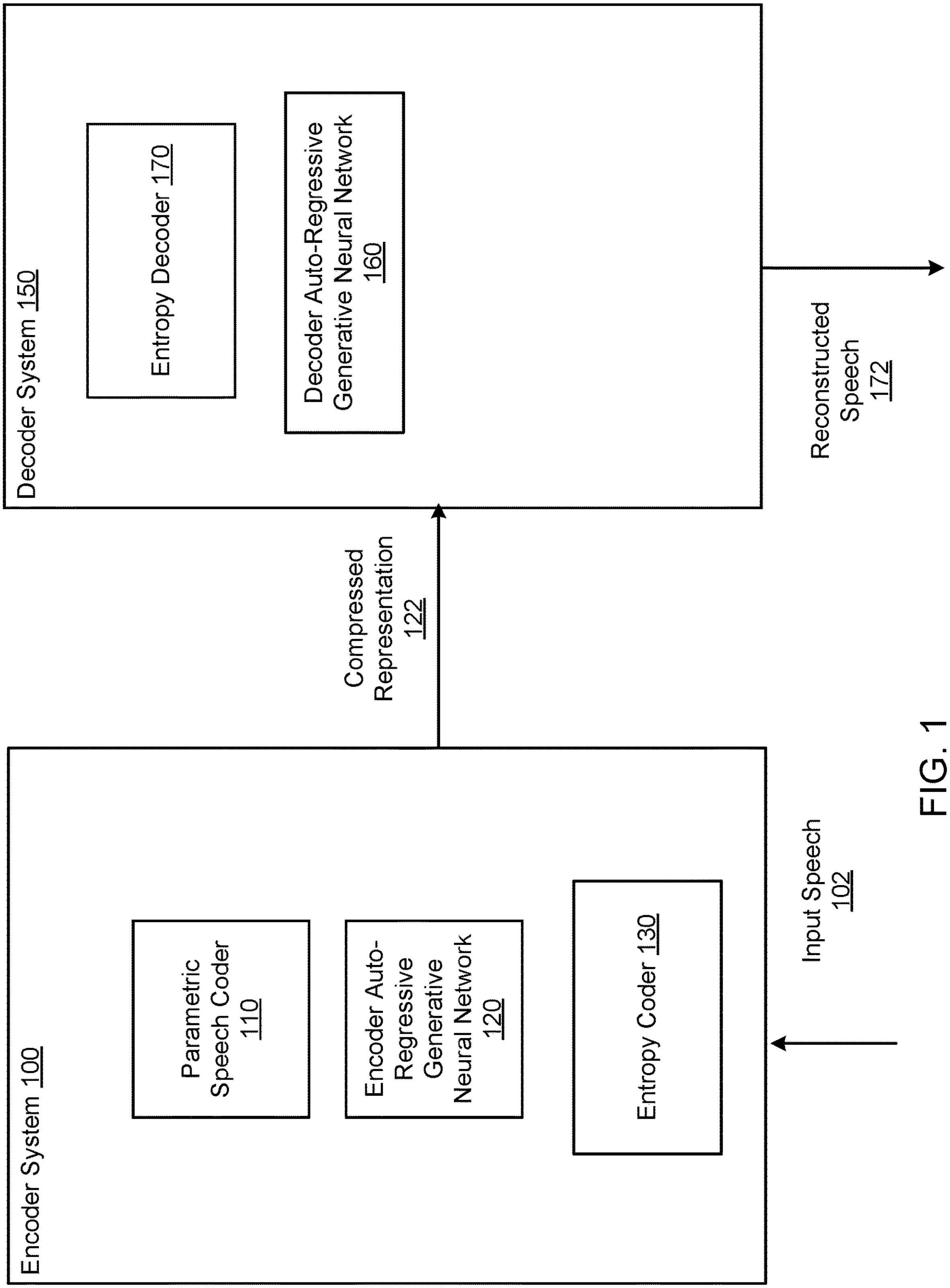
FIG. 1 shows an example encoder system and an example decoder system.

FIG. 1 shows an example encoder system 100 and an example decoder system 150. The encoder system 100 and decoder system 150 are examples of systems implemented as computer programs on one or more computers in one or more locations, in which the systems, components, and techniques described below can be implemented.

The encoder system 100 receives input speech 102 and encodes the input speech 102 to generate a compressed representation 122 of the input speech 102.

The decoder system 150 receives the compressed representation 122 of the input speech 150 and generates reconstructed speech 172 that is a reconstruction of the input speech 102. That is, the decoder system 150 determines an estimate of the input speech 102 based on the compressed representation 122 of the input speech 102.

Generally, the input speech 102 is a sequence that includes a respective audio sample at each of multiple time steps. Each time step in the sequence corresponds to a respective time in an audio waveform and the audio sample at the time step characterizes the waveform at the corresponding time. In some implementations, the audio sample at each time step in the sequence is the amplitude of the audio waveform at the corresponding time.

Similarly, the reconstructed speech 172 is also a sequence of audio samples, with the audio sample at each time step in the reconstructed speech 172 being an estimate of the audio sample at the corresponding time step in the input speech 102.

Once the reconstructed speech 172 has been generated, the decoder system 150 can provide the reconstructed speech 172 for playback to a user.

In particular, the encoder system 100 includes a parametric speech coder 110. Optionally, the encoder system 100 can also include an encoder auto-regressive generative neural network 120 and an entropy speech encoder 130.

The decoder system 150 includes a decoder auto-regressive generative neural network 160 and, optionally, an entropy speech decoder 170.

The parametric speech coder 110 represents the input speech 102 as a set of parametric coding parameters. In other words, the parametric speech coder 110 processes the input speech 102 to determine a set of parametric coding parameters that represent the input speech 102.

More particularly, when used for encoding speech, a parametric coder transmits only the conditioning variables, i.e., the parametric coding parameters, of a generative model that generates a speech signal at the decoder. The generative model at the decoder then generates the speech signal conditioned on the conditioning variables. Thus, no waveform information is transmitted from the encoder to the decoder and the decoder generates a waveform based on the conditioning variables, i.e., instead of attempting to approximate the original waveform using waveform information. Parametric coders generally compute a set of parametric coder parameters that includes parameters that encode one or more of: the spectral envelope of the speech input, the pitch of the speech input, or the voicing level of the speech input.

Any of a variety of parametric coders 110 can be used by the encoder system 100. For example, the parametric coder can be one that computes the parametric coder parameters using an approach based on a temporal perspective with glottal pulse trains or one that computes the parametric coder parameters using an approach based on a frequency domain perspective with sinusoids. As a particular example, the parametric coder 110 can be a Codec 2 speech coder.

In some implementations, the encoder system 100 operates using a parametric coding-only scheme and therefore transmits only the parametric coding parameters, i.e., as computed by the parametric coder 110 or in a further compressed form, to the decoder system 100 as the compressed representation 122 of the input speech 102.

In these implementations, the decoder system 150 uses the decoder auto-regressive generative neural network 160 and the parametric coding parameters to generate the reconstructed speech 172. For example, the decoder system 150 can first decode the further compressed parametric coding parameters and then use the parametric coding parameters to cause the decoder auto-regressive generative neural network 160 to generate an output speech sequence.

The decoder auto-regressive generative neural network 160 is a neural network that is configured to compute, at each particular time step of the time steps in the reconstructed speech, a discrete probability distribution of the next signal sample (i.e., the signal sample at the particular time step) conditioned on the past output signal, i.e., the samples at time steps preceding the particular time step and the parametric coding parameters. For example, the discrete probability distribution can be a distribution over raw amplitude values, μ-law transformed amplitude values, or amplitude values that have been compressed or companded using a different technique.

In particular, in some implementations, the decoder auto-regressive generative neural network 160 is a convolutional neural network that has a multi-layer architecture that uses dilated convolutional layers with gated cells, i.e., gated activation functions. The past output signal is provided as input to the first convolutional layer in the neural network 160 and the neural network 160 is conditioned on a given conditioning sequence by conditioning the gated activation functions of at least one of the convolutional layers on the conditioning sequence, i.e., providing the conditioning sequence or a portion of the conditioning sequence along with the output of the convolution applied by that layer as input to the gated activation function. An example convolutional neural network that generates speech and techniques for conditioning the convolutional layers of the network are described in more detail in International Application No. PCT/US2017/050320, filed on Sep. 6, 2017, the entire contents of which is hereby incorporated herein by reference and in A. van den Oord, S. Dieleman, H. Zen, K. Simonyan, O. Vinyals, A. Graves, N. Kalchbrenner, A. Senior, and K. Kavukcuoglu, "WaveNet: A generative model for raw audio," ArXiv e-prints, September 2016. In particular, while these references describe conditioning the neural network on different types of conditioning variables, e.g., linguistic features, those different types of conditioning variables can be replaced with the parametric coding parameters.

In some other implementations, the decoder generative neural network is a recurrent neural network that maintains an internal state and auto-regressively generates each output sample while conditioned on a conditioning sequence by, at each time step, updating the internal state of the recurrent neural network and computing a discrete probability distribution over the possible samples at the time step. In these implementations, processing a current sequence at a given time step using the generative neural network means providing as input to the recurrent neural network the most recent sample in the sequence and the current internal state of the recurrent neural network as of the time step. One example of a recurrent neural network that generates speech and techniques for conditioning such a recurrent neural network on a conditioning sequence are described in SampleRNN: An Unconditional End-to-End Neural Audio Generation Model, Soroush Mehri, et al. Another example of a recurrent neural network that generates speech and techniques for conditioning such a recurrent neural network on a condition sequence are described in Efficient Neural Audio Synthesis, Nal Kalchbrenner, et al.

The neural network 160 can be trained subject to the same conditioning variables that are used during run-time to cause the neural network to operate as described in this specification. In particular, the neural network 160 can be trained using supervised learning on a training database containing a large number of different talkers providing a wide variety of voice characteristics, e.g., without conditioning on a label that identifies the talker.

The parametric coding parameters will generally be lower-rate than is required for conditioning the decoder neural network 160. That is, each time step in the reconstructed speech will correspond to a shorter duration of time than is accounted for by the parametric coding parameters. Accordingly, the decoder 150 generates a conditioning sequence from the parametric coding parameters and conditions the decoder neural network 160 on the conditioning sequence. In particular, in the conditioning sequence, each set of parametric coding parameters is repeated at a fixed number of multiple time steps to extend the bandwidth of the parametric coding parameters and account for the lower-rate.

Thus, in the parametric coding-only scheme, the decoder system 150 receives the parametric coding parameters and auto-regressively generates the reconstructed output sequence sample by sample by conditioning the decoder auto-regressive neural network 160 on the parametric coding parameters and then sampling an output from the probability distribution computed by the decoder auto-regressive neural network 160 at each time step.

When the neural network 160 computes distributions over μ-law transformed amplitude values, the decoder 150 then decodes the sequence of μ-law transformed sampled values to generate the final reconstructed speech 172 using conventional μ-law transform decoding techniques.

In some other implementations, the encoder system 100 operates using a waveform-coding scheme to encode the input speech 102.

In particular, in these implementations, the encoder system 100 quantizes the amplitude values in the input speech, e.g., using μ-law transforms, to obtain a sequence of quantized values. The entropy coder 130 then entropy codes the sequence of quantized values and the entropy coded values are transmitted along with the parametric coder parameters to the decoder system 150 as the compressed representation 122 of the input speech 102.

Entropy coding is a coding technique that encodes sequences of values. In particular, more frequently occurring values are encoded using fewer bits than relatively less frequently occurring values. The entropy coder 130 can use any conventional entropy coding technique, e.g., arithmetic coding, to entropy code the quantized speech sequence.

However, these entropy coding techniques require a conditional probability distribution over possible values for each quantized value in the sequence. That is, entropy coding encodes a sequence of input values based on the sequence of inputs and, for each input in the sequence, a conditional probability distribution that represents the probability of the possible values given the previous values in the sequence.

To compute these conditional probability distributions, the encoder 100 uses the encoder auto-regressive generative neural network 120. The encoder auto-regressive generative neural network 120 has an identical architecture and the same parameter values as the decoder auto-regressive generative neural network 160. For example, a single auto-regressive generative neural network may have been trained to determined trained parameter values and then those trained parameter values may be used in deploying both the neural network 120 and the neural network 160. Thus, the encoder neural network 120 operates the same way as the decoder neural network 160. That is, the encoder neural network 120 also computes, at each particular time step of the time steps in a speech sequence, a discrete probability distribution of the next signal sample (i.e., the signal sample at the particular time step) conditioned on the past output signal, i.e., the samples at time steps preceding the particular time step and the parametric coding parameters.

To compute the conditioning probability distributions for the entropy coder 130, the encoder 100 conditions the encoder neural network 120 on the parametric coding parameters and, at each time step, provides as input to the encoder neural network 120 the quantized values at preceding time steps in the quantized speech sequence. The probability distribution computed by the encoder neural network 120 for a given time step is then the conditional probability distribution for the quantized speech value at the corresponding time step in the quantized sequence. Because only the probability distributions and not sampled values are required, the encoder 100 does not need to sample values from the probability distributions computed by the encoder neural network 120.

As described above, the entropy coder 120 then entropy encodes the input speech 102 using the probability distributions computed by the encoder neural network 120.

In the waveform-only scheme, the decoder system 150 receives, as the compressed representation, the parametric coding parameters and the entropy encoded speech input (i.e., the entropy encoded quantized speech values).

In the waveform-only scheme, the entropy decoder 170 then entropy decodes the entropy encoded speech input to obtain the reconstructed speech 172. Generally, the entropy decoder 170 entropy decodes the encoded speech using the same entropy coding technique used by the entropy encoder 130 to encode the speech. Thus, like the entropy encoder 130, the entropy decoder 170 requires a sequence of conditional probability distributions to entropy decode the entropy coded speech.

The decoder system 150 uses the decoder auto-regressive generative neural network 160 to compute the sequence of conditional probability distributions. In particular, like in the parametric coding only scheme, at each time step in the speech sequence, the decoder auto-regressive generative neural network 160 is conditioned on the parametric coding parameters. However, unlike in the parametric coding scheme, the input to the decoder auto-regressive generative neural network 160 at each time step is the sequence of already entropy decoded samples. The neural network 160 then computes a probability distribution and the entropy decoder uses that probability distribution to entropy decode the next sample. Thus, like with the encoder neural network 120, the decoder 150 does not need to sample from the distributions computed by the decoder neural network 160 when using the waveform decoding scheme (i.e., because the input to the neural network 160 are entropy decoded values instead of values previously generated by the neural network 160).

The parametric coding scheme is generally more efficient than the waveform coding scheme, i.e., because less data is required to be transmitted from the encoder 100 to the decoder 150. However, the parametric coding scheme cannot guarantee the reconstruction quality of the reconstructed speech because the decoder neural network 160 is required to generate each speech sample instead of simply providing the probability distribution for the entropy decoding technique. That is, the parametric coding scheme generates the speech samples instead of decoding encoded waveform information to reconstruct the speech samples.

In some other implementations, to improve efficiency while still improving reconstruction quality, the encoder system 100 operates using a hybrid scheme.

In the hybrid scheme, the encoder system 100 uses the waveform coding scheme only when speech encoded using the parametric coding scheme is unlikely to be accurately reconstructed by the decoder system 150, i.e., generative performance for the speech will be poor and the decoder 150 will not be able to generate speech that sounds the same as the input speech. In particular, the system can check, using the encoder neural network 120, whether the decoder system 150 will be able to accurately reconstruct a given segment of speech and, if not, revert to using the waveform coding scheme to encode the speech segment.

In particular, using the encoder neural network 120, the encoder system 100 has a conditional probability of the next sample given the past signal. If this probability is persistently relatively low for a signal segment, this indicates that the autoregressive model is poor for the signal segment. When the probability of the next sample is consistently low compared to a threshold probability, then the encoder system 100 activates the waveform coding scheme for the signal segment instead of using the parametric coding scheme. In some implementations, the threshold is varied between different portions of the speech signal, e.g., with voiced speech having a higher threshold than unvoiced speech.

The hybrid scheme is described in more detail below with reference to FIG. 4.

In some implementations, the encoder system 100 and the decoder system 150 are implemented on the same set of one or more computers, i.e., when the compression is being used to reduce the storage size of the speech data when stored locally by the set of one or more computers. In these implementations, the encoder system 120 stores the compressed representation 122 in a local memory accessible by the one or more computers so that the compressed representation can be accessed by the decoder system 150.

In some other implementations, the encoder system 100 and the decoder system 150 are remote from one another, i.e., are implemented on respective computers that are connected through a data communication network, e.g., a local area network, a wide area network, or a combination of networks. In these implementations, the compression is being used to reduce the bandwidth required to transmit the input speech 102 over the data communication network. In these implementations, the encoder system 120 provides the compressed representation 122 to the decoder system 150 over the data communication network for use in reconstructing the input speech 102.

Figure 2:
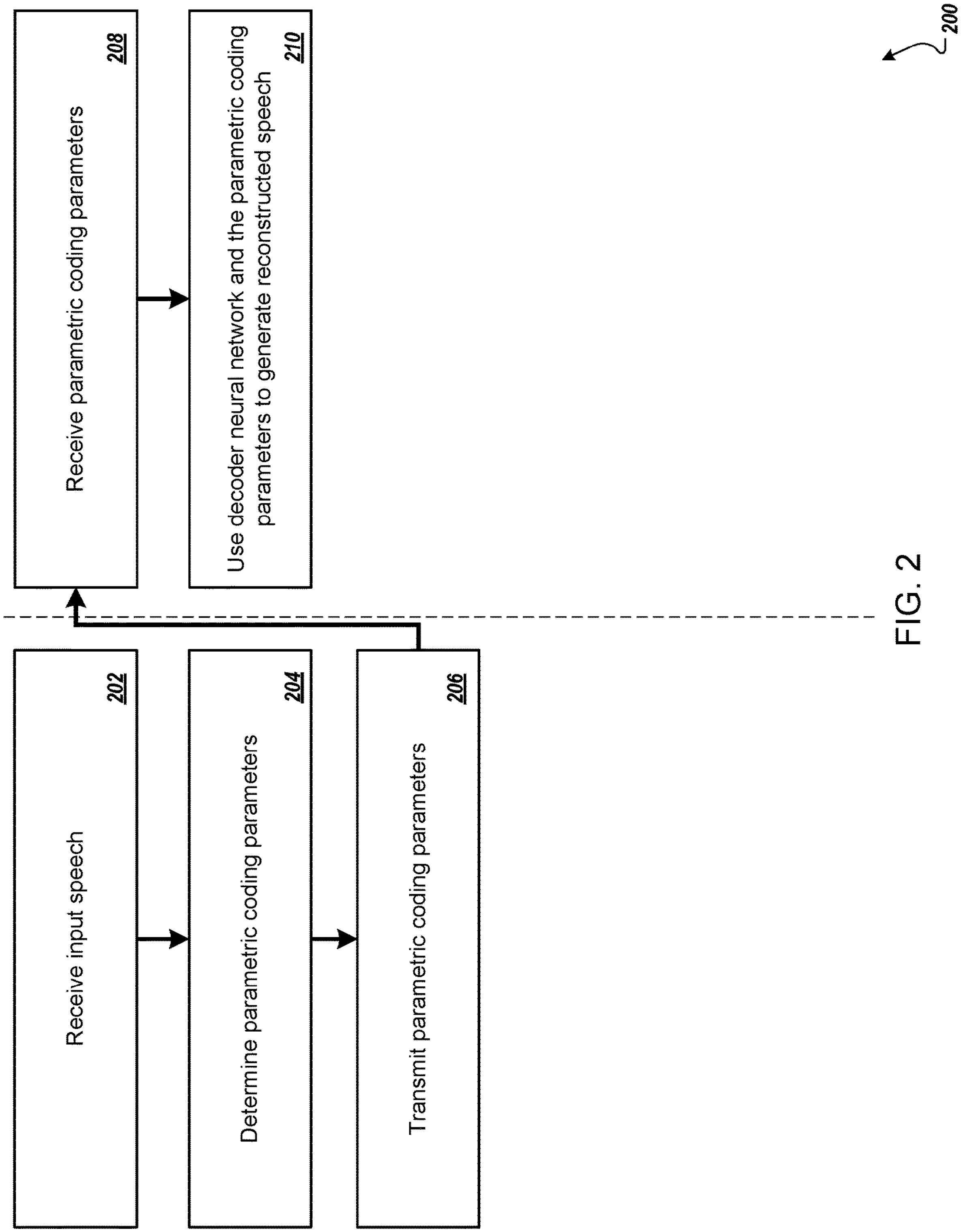
FIG. 2 is a flow diagram of an example process for compressing and reconstructing input speech using a parametric coding only scheme.

FIG. 2 is a flow diagram of an example process 200 for compressing and reconstructing input speech using a parametric coding only scheme. For convenience, the process 200 will be described as being performed by a system of one or more computers located in one or more locations. For example, an encoder system and a decoder system, e.g., the encoder system 100 of FIG. 1 and the decoder system 150 of FIG. 1, appropriately programmed, can perform the process 200.

The encoder system receives input speech (step 202).

The encoder system processes the input speech using a parametric coder to determine parametric coding parameters (step 204).

The encoder system transmits the parametric coding parameters to the decoder system (step 206), e.g., as computed by an entropy coder or in a further compressed form.

The decoder system receives the parametric coding parameters (step 208).

The decoder system uses the decoder auto-regressive generative neural network and the parametric coding parameters to generate reconstructed speech (step 210). In particular, the decoder auto-regressively generates the reconstructed speech by, at each time step, conditioning the decoder neural network on the parametric coding parameters and the already generated speech and then sampling a new signal sample from the distribution computed by the decoder neural network, thus generating a speech signal that is perceived as similar tor identical to the input speech.

Figure 3:
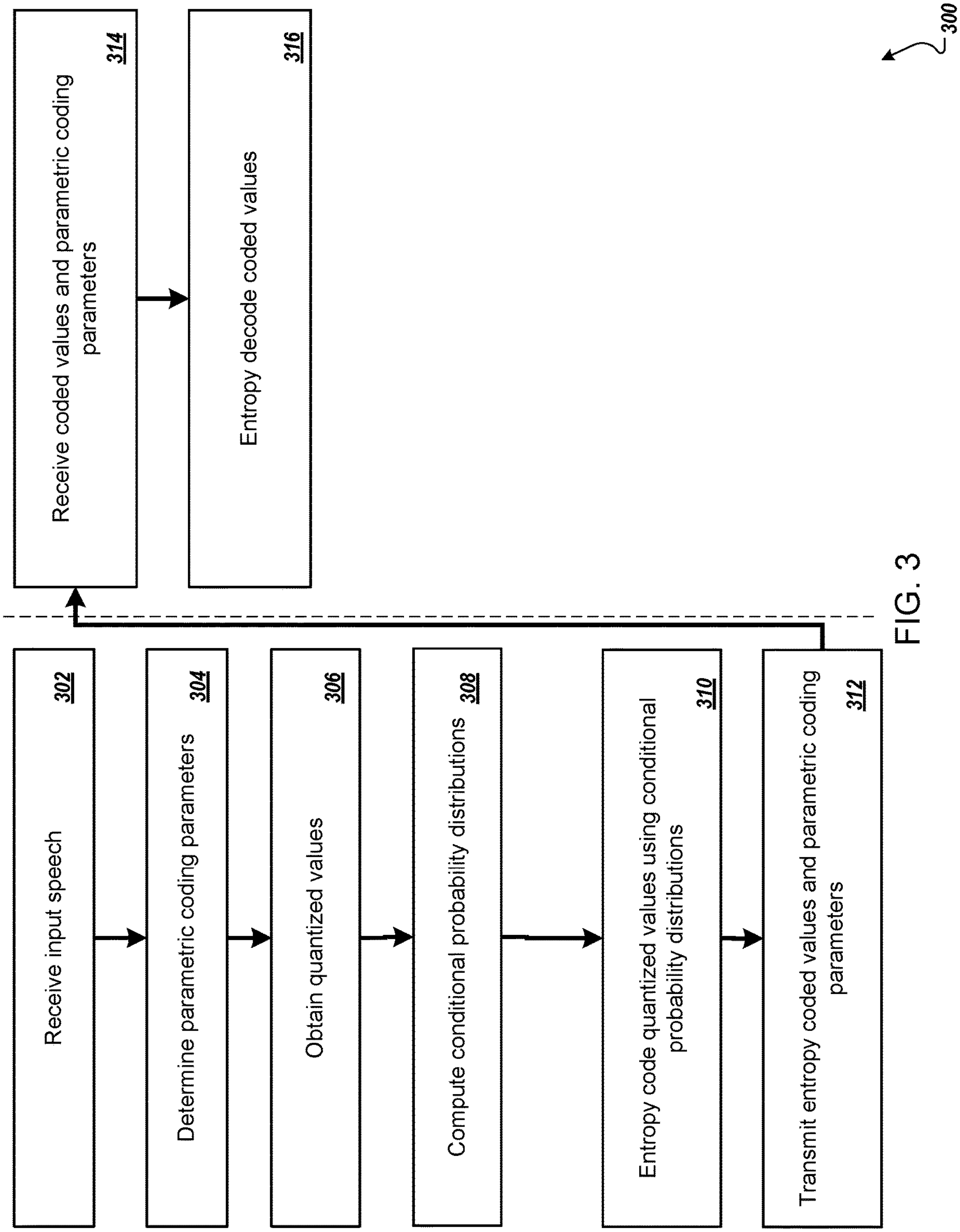
FIG. 3 is a flow diagram of an example process for compressing and reconstructing input speech using a waveform coding only scheme.

FIG. 3 is a flow diagram of an example process 300 for compressing and reconstructing input speech using a waveform coding only scheme. For convenience, the process 300 will be described as being performed by a system of one or more computers located in one or more locations. For example, an encoder system and a decoder system, e.g., the encoder system 100 of FIG. 1 and the decoder system 150 of FIG. 1, appropriately programmed, can perform the process 300.

The encoder system receives input speech (step 302).

The encoder system processes the input speech using a parametric coder to determine parametric coding parameters (step 304).

The encoder system quantizes the amplitude values in the input speech to obtain a sequence of quantized values (step 306).

The encoder system computes a sequence of conditional probability distributions using the encoder auto-regressive generative neural network, i.e., by conditioning the encoder neural network on the parametric coding parameters (step 308).

The encoder system entropy codes the quantized values using the conditional probability distributions (step 310).

The encoder system transmits the parametric coding parameters and the entropy coded values to the decoder system (step 312).

The decoder system receives the generated parametric coding parameters and the entropy coded values (step 314).

The decoder system entropy decodes the entropy coded values using the parametric coding parameters to obtain the reconstructed speech (step 316). In particular, the decoder system computes the conditional probability distributions using the decoder neural network (while the decoder neural network is conditioned on the parametric coding parameters) and uses each conditional probability distribution to decode the corresponding entropy coded value.

Figure 4:
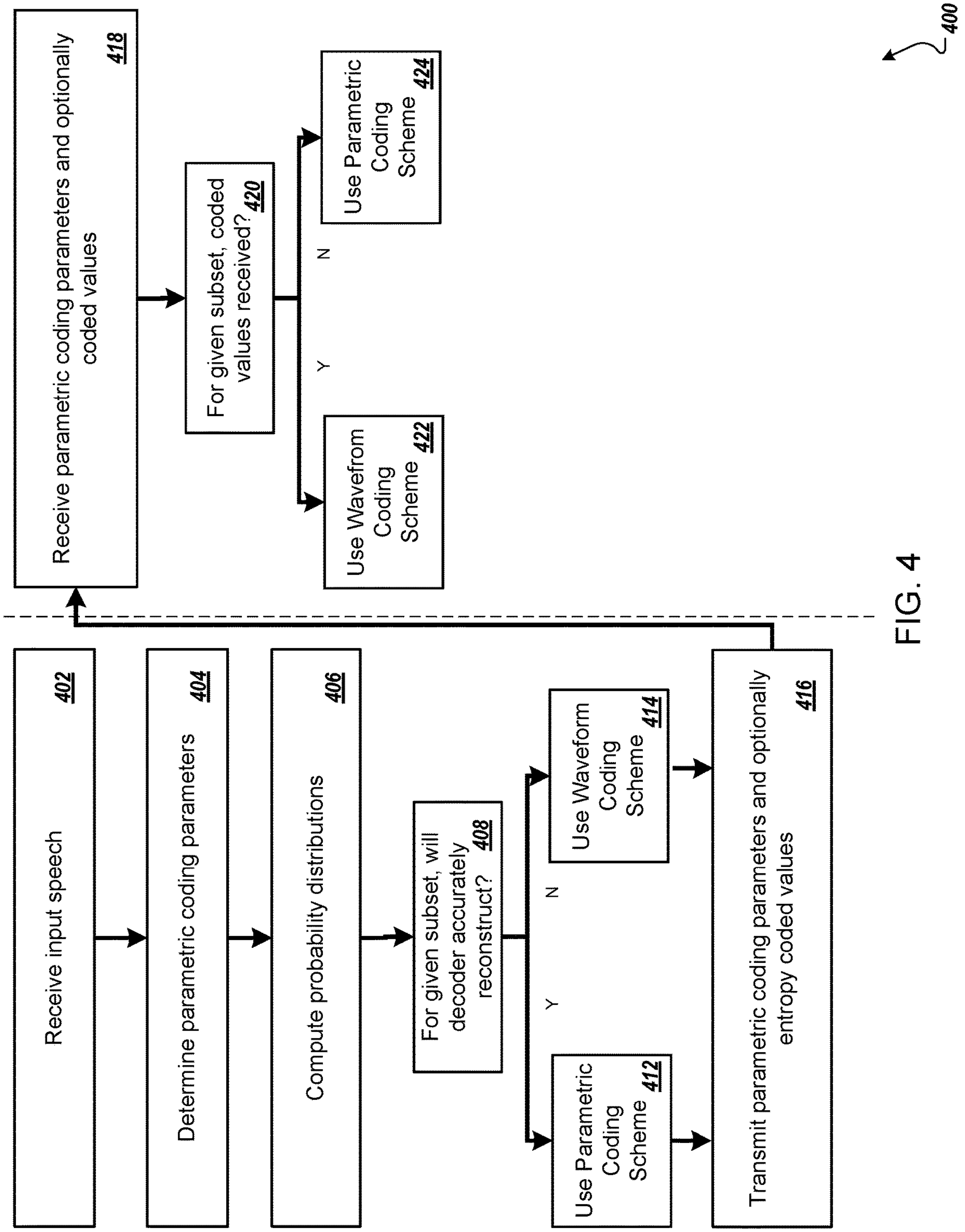
FIG. 4 is a flow diagram of an example process for compressing and reconstructing input speech using a hybrid scheme.

FIG. 4 is a flow diagram of an example process 400 for compressing and reconstructing input speech using a hybrid scheme. For convenience, the process 400 will be described as being performed by a system of one or more computers located in one or more locations. For example, an encoder system and a decoder system, e.g., the encoder system 100 of FIG. 1 and the decoder system 150 of FIG. 1, appropriately programmed, can perform the process 400.

The encoder system receives input speech (step 402).

The encoder system processes the input speech using a parametric coder to determine parametric coding parameters (step 404).

The encoder system computes a respective probability distribution for each input sample in the input speech using the encoder neural network (step 406). In particular, the system conditions the encoder neural network on the parametric coding parameters and processes an input speech sequence that includes a respective observed (or quantized) sample from the input speech using the encoder neural network to compute a respective probability distribution for each of the plurality of time steps in the input speech.

The encoder system determines, from the probability distributions and for a given subset of the time steps, whether the decoder will be able to accurately reconstruct the speech at those time steps using only the parametric coding parameters (step 408). In particular, the encoder system determines whether, for the given subset of the time steps, the decoder system will be able to generate speech that sounds like the actual speech at those time steps when operating using the parametric coding only scheme. In other words, the encoder system determines whether the decoder neural network will be able to accurately reconstruct the speech at the time steps when conditioned on the parametric coding parameters.

The system can use the probability distributions to make this determination in any of a variety of ways. For example, the system can make the determination based on, for each time step, the score assigned to the actual observed sample at the time step by the probability distribution at the time step. For example, if the score assigned to the actual observed sample is below a threshold value for at least a threshold proportion of the time steps in a speech segment, the system can determine that the decoder will not be able to accurately reconstruct the input speech at the corresponding subset of time steps.

If the encoder system determines that the decoder will be able to accurately reconstruct the speech at the subset of time steps, the encoder system encodes the speech while operating using the parametric coding only scheme (step 412). That is, the encoder transmits only parametric coding parameters corresponding to the first set of time steps for use by the decoder (and does not transmit any waveform information).

If the encoder system determines that the decoder will not be able to accurately reconstruct the speech at the subset of time steps, the encoder system encodes the speech while operating using the waveform coding only scheme (step 414). That is, the encoder transmits parametric coding parameters and entropy coded values (obtained as described above) for the first set of time steps for use by the decoder.

The encoder system transmits the parametric coding parameters and, when the waveform coding scheme was used, the entropy coded values to the decoder system (step 416).

The decoder system receives the parametric coding parameters and, in some cases, the entropy coded values (step 418).

The decoder system determines whether entropy coded values were received for the given subset (step 420).

If entropy coded values were received for the given subset, the decoder system reconstructs the speech at the given subset of time steps using the waveform coding scheme (step 422), i.e., as described above with reference to FIG. 3.

If entropy coded values were not received, the decoder system reconstructs the speech at the given subset of time steps using the parametric coding scheme (step 424).

In particular, the decoder system samples from the probability distributions computed by the decoder neural network to generate the speech at each of the time steps in the given subset and provides as input to the decoder neural network the previously sampled value (i.e., because no entropy decoded values are available for the given subset of time steps).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving, by an encoder computer system, a sequence of audio samples, wherein each audio sample in the sequence is associated with a corresponding time step in a plurality of time steps;

processing the sequence of audio samples using a parametric coder to generate a plurality of parametric coding parameters characterizing the sequence of audio samples;

quantizing the sequence of audio samples to generate a sequence of quantized audio values comprising a respective quantized audio value at each of the plurality of time steps;

entropy coding the sequence of quantized audio values based on a respective probability distribution for each of the plurality of time step that is computed by an encoder generative neural network from the sequence of quantized audio values; and providing the plurality of parametric coding parameters and the entropy coded quantized audio values as a compressed representation of the sequence of audio samples from the encoder computer system to a decoder computer system for use in reconstructing the sequence of audio samples.

2. The method of claim 1, wherein each time step corresponds to a respective time in an audio waveform and the audio sample associated with the time step characterizes a waveform at the respective time in the audio waveform.

3. The method of claim 2, wherein the audio sample associated with the time step comprises an amplitude value of the waveform at the respective time.

4. The method of claim 3, wherein quantizing the sequence of audio samples to generate the sequence of quantized audio values comprises:

quantizing the amplitude values in the sequence of audio samples.

5. The method of claim 1, further comprising:

receiving, at the decoder computer system, the plurality of parametric coding parameters and the entropy coded quantized audio values; and generating, by the decoder computer system and based on the plurality of parametric coding parameters and the entropy coded quantized audio values, a reconstruction of the sequence of audio samples.

6. The method of claim 5, wherein generating the reconstruction of the sequence of audio samples comprises:

autoregressively generating the reconstruction of the sequence of audio samples by, at each decoder time step in a plurality of decoder time steps, conditioning a current reconstructed audio sample corresponding to the decoder time step on already generated reconstructed audio samples corresponding to previous decoder time steps that precede the decoder time step.

7. The method of claim 1, wherein the compressed representation of the sequence of audio samples is in a form of a bitstream.

8. The method of claim 1, wherein the sequence of audio samples represents spoken speech.

9. A system comprising:

one or more computers; and one or more storage devices communicatively coupled to the one or more computers, wherein the one or more storage devices store instructions that, when executed by the one or more computers, cause the one or more computers to perform operations comprising:

receiving, by an encoder computer system, a sequence of audio samples, wherein each audio sample in the sequence is associated with a corresponding time step in a plurality of time steps;

processing the sequence of audio samples using a parametric coder to generate a plurality of parametric coding parameters characterizing the sequence of audio samples;

quantizing the sequence of audio samples to generate a sequence of quantized audio values comprising a respective quantized audio value at each of the plurality of time steps;

entropy coding the sequence of quantized audio values based on a respective probability distribution for each of the plurality of time step that is computed by an encoder generative neural network from the sequence of quantized audio values; and providing the plurality of parametric coding parameters and the entropy coded quantized audio values as a compressed representation of the sequence of audio samples from the encoder computer system to a decoder computer system for use in reconstructing the sequence of audio samples.

10. The system of claim 9, wherein each time step corresponds to a respective time in an audio waveform and the audio sample associated with the time step characterizes a waveform at the respective time in the audio waveform.

11. The system of claim 10, wherein the audio sample associated with the time step comprises an amplitude value of the waveform at the respective time.

12. The system of claim 11, wherein quantizing the sequence of audio samples to generate the sequence of quantized audio values comprises:

quantizing the amplitude values in the sequence of audio samples.

13. The system of claim 9, wherein the operations further comprise:

receiving, at the decoder computer system, the plurality of parametric coding parameters and the entropy coded quantized audio values; and generating, by the decoder computer system and based on the plurality of parametric coding parameters and the entropy coded quantized audio values, a reconstruction of the sequence of audio samples.

14. The system of claim 13, wherein generating the reconstruction of the sequence of audio samples comprises:

autoregressively generating the reconstruction of the sequence of audio samples by, at each decoder time step in a plurality of decoder time steps, conditioning a current reconstructed audio sample corresponding to the decoder time step on already generated reconstructed audio samples corresponding to previous decoder time steps that precede the decoder time step.

15. The system of claim 9, wherein the compressed representation of the sequence of audio samples is in a form of a bitstream.

16. The system of claim 9, wherein the sequence of audio samples represents spoken speech.

17. One or more non-transitory computer storage media storing instructions that when executed by one or more computers cause the one or more computers to perform operations comprising:

receiving, by an encoder computer system, a sequence of audio samples, wherein each audio sample in the sequence is associated with a corresponding time step in a plurality of time steps;

processing the sequence of audio samples using a parametric coder to generate a plurality of parametric coding parameters characterizing the sequence of audio samples;

quantizing the sequence of audio samples to generate a sequence of quantized audio values comprising a respective quantized audio value at each of the plurality of time steps;

entropy coding the sequence of quantized audio values based on a respective probability distribution for each of the plurality of time step that is computed by an encoder generative neural network from the sequence of quantized audio values; and providing the plurality of parametric coding parameters and the entropy coded quantized audio values as a compressed representation of the sequence of audio samples from the encoder computer system to a decoder computer system for use in reconstructing the sequence of audio samples.

18. The non-transitory computer storage media of claim 17, wherein each time step corresponds to a respective time in an audio waveform and the audio sample associated with the time step characterizes a waveform at the respective time in the audio waveform.

19. The non-transitory computer storage media of claim 18, wherein the audio sample associated with the time step comprises an amplitude value of the waveform at the respective time.

20. The non-transitory computer storage media of claim 19, wherein quantizing the sequence of audio samples to generate the sequence of quantized audio values comprises:

quantizing the amplitude values in the sequence of audio samples.

* * * * *